(12) United States Patent
Park et al.

(10) Patent No.: US 8,969,465 B2
(45) Date of Patent: Mar. 3, 2015

(54) THERMOPLASTIC RESIN COMPOSITION AND MOLDED ARTICLE USING THE SAME

(71) Applicant: Cheil Industries, Inc., Gumi-si (KR)

(72) Inventors: Jung-Eun Park, Uiwang-si (KR); Kee-Hae Kwon, Uiwang-si (KR); Jin-Young Huh, Uiwang-si (KR); Chang-Min Hong, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/132,302

(22) Filed: Dec. 18, 2013

(65) Prior Publication Data

US 2014/0179856 A1    Jun. 26, 2014

(30) Foreign Application Priority Data

Dec. 21, 2012   (KR) .................. 10-2012-0151289

(51) Int. Cl.
| | | |
|---|---|---|
| *B60C 1/00* | (2006.01) | |
| *C08K 3/40* | (2006.01) | |
| *C08F 12/02* | (2006.01) | |
| *C08L 69/00* | (2006.01) | |

(52) U.S. Cl.
CPC ..................................... *C08L 69/00* (2013.01)
USPC ........................... 524/494; 524/496; 526/346

(58) Field of Classification Search
CPC ......... C08L 69/00; C08L 25/12; C08L 55/02; C08K 7/14
USPC .................... 524/494, 496; 526/346
See application file for complete search history.

(56) References Cited

U.S. PATENT DOCUMENTS

| | | | |
|---|---|---|---|
| 5,384,353 A | 1/1995 | Gemmell et al. | |
| 8,664,322 B2 * | 3/2014 | Lee et al. ................ | 524/494 |
| 2008/0015289 A1 | 1/2008 | Siripurapu | |
| 2011/0071246 A1 | 3/2011 | Kim et al. | |
| 2012/0100377 A1 | 4/2012 | Seidel et al. | |

FOREIGN PATENT DOCUMENTS

| | | |
|---|---|---|
| JP | 07-048498 A | 2/1995 |
| JP | 2000-336227 A | 12/2000 |
| JP | 2001-164105 A | 6/2001 |
| JP | 2009-275172 A | 11/2009 |
| JP | 2011-001514 A | 1/2011 |
| KR | 10-2007-0071446 A | 7/2007 |
| KR | 10-2009-0026359 A | 3/2009 |
| KR | 10-2010-0022376 A | 3/2010 |
| KR | 10-2011-0059886 A | 6/2011 |
| KR | 10-2011-0072491 A | 6/2011 |

OTHER PUBLICATIONS

Samakrut, et al., "Characterization of Short Glass Fiber-Reinforces PC/ABS Blends," Journal of Metals, Materials and Minerals. vol. 18, No. 2, pp. 207-211, 2008.

* cited by examiner

*Primary Examiner* — William Cheung
(74) *Attorney, Agent, or Firm* — Additon, Higgins & Pendleton, P.A.

(57) ABSTRACT

Disclosed are a thermoplastic resin composition including (A) a polycarbonate resin, (B) an aromatic vinyl-based copolymer, (C) a rubber modified vinyl-based graft copolymer, and (D) a glass fiber, wherein the glass fiber (D) includes (D-1) a first glass fiber having a length of about 1 μm to about 200 μm and (D-2) a second glass fiber having a length of about 2 mm to about 6 mm, and a molded article using the same.

8 Claims, No Drawings

THERMOPLASTIC RESIN COMPOSITION AND MOLDED ARTICLE USING THE SAME

CROSS-REFERENCE TO RELATED APPLICATION

This application claims priority to and the benefit of Korean Patent Application No. 10-2012-0151289 filed in the Korean Intellectual Property Office on Dec. 21, 2012, the entire disclosure of which is incorporated herein by reference.

FIELD OF THE INVENTION

A thermoplastic resin composition and a molded article using the same are disclosed.

BACKGROUND OF THE INVENTION

A polycarbonate resin has excellent heat resistance and transparency and is increasingly used in various fields such as an exterior material for electric/electronic goods, auto parts, and the like. The polycarbonate resin can be mixed with a styrene-containing copolymer to improve impact strength and processability.

In particular, a rubber-modified vinyl-based graft copolymer has good processability and excellent impact strength and appearance and thus, is widely used for electric/electronic goods as a mixture with the polycarbonate resin.

In addition, in order to increase the chemical resistance of the mixed resin of the polycarbonate resin and the rubber-modified vinyl-based graft copolymer, the mixed resin can be blended with another resin having chemical resistance, for example, polyethylene terephthalate.

However, the resin composition has drawbacks of deteriorated heat resistance, excess moisture due to active hydrolysis, and a limited use at a high temperature.

Korean Patent Laid-Open Nos. 10-2007-0071446, 10-2009-0026359, and 10-2010-0022376 disclose a method of improving chemical resistance by blending the mixed resin with other resins having chemical resistance. However, this method only slightly improves chemical resistance and also deteriorates impact strength.

In addition, an additive such as a mineral fiber and the like may be added to the mixed resin of the polycarbonate resin and the rubber-modified vinyl-based graft copolymer to provide dimensional stability. A conventional additive, however, typically will not provide dimensional stability.

SUMMARY OF THE INVENTION

A thermoplastic resin composition that can have improved impact resistance, heat resistance, dimensional stability and/or appearance and a molded article using the same are provided.

In one embodiment of the present invention, a thermoplastic resin composition includes (A) a polycarbonate resin, (B) an aromatic vinyl-based copolymer, (C) a rubber modified vinyl-based graft copolymer, and (D) a glass fiber. The glass fiber (D) includes (D-1) a first glass fiber having a length of about 1 µm to about 200 µm and (D-2) a second glass fiber having a length of about 2 mm to about 6 mm.

The polycarbonate resin (A) may have a weight average molecular weight of about 10,000 g/mol to about 25,000 g/mol.

The glass fiber (D) may include the first glass fiber (D-1) and the second glass fiber (D-2) in a weight ratio of about 1:1 to about 1:4.

The thermoplastic resin composition may include the glass fiber (D) in an amount of about 5 wt % to about 30 wt % based on 100 wt % of the thermoplastic resin composition.

The thermoplastic resin composition may include about 20 wt % to about 70 wt % of the polycarbonate resin (A), about 15 wt % to about 35 wt % of the aromatic vinyl-based copolymer (B), about 1 wt % to about 20 wt % of a rubber modified vinyl-based graft copolymer (C), and about 5 wt % to about 30 wt % of the glass fiber (D).

In another embodiment of the present invention, a molded article using the thermoplastic resin composition is provided.

The molded article may include (D-3) a third glass fiber having a length of about 0.1 µm to about 100 µm and (D-4) a fourth glass fiber having a length of about 150 µm to about 1,000 µm.

In the molded article, a weight ratio of the third glass fiber (D-3) and the fourth glass fiber (D-4) may be about 1:1 to about 1:4.

The thermoplastic resin composition according to one embodiment of the present invention and a molded article using the same may have improved impact resistance, heat resistance, dimensional stability, and/or appearance.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a definition is not otherwise provided, the term "substituted" refers to one substituted with C1 to C30 alkyl; C1 to C10 alkylsilyl; C3 to C30 cycloalkyl; C6 to C30 aryl; C2 to C30 heteroaryl; C1 to C10 alkoxy; a fluoro group, C1 to C10 trifluoroalkyl such as trifluoromethyl and the like; a cyano group, or a combination thereof, in place of at least one hydrogen of a compound.

As used herein, when a definition is not otherwise provided, the term "hetero" may refer to one including 1 to 3 heteroatoms including N, O, S, P, or a combination thereof, in place of one or more carbon atoms in a compound or a substituent.

As used herein, when a definition is not otherwise provided, the term "alkyl group" may refer to a "saturated alkyl group" without an alkene group or an alkyne group; or an "unsaturated alkyl group" including at least one of an alkene group and/or an alkyne group. The term "alkene group" may refer to a substituent in which at least two carbon atoms are bound with at least one carbon-carbon double bond, and the term "alkynyl group" refers to a substituent in which at least two carbon atoms are bound with at least one carbon-carbon triple bond. The alkyl group may be a branched, linear, or cyclic alkyl group.

The alkyl group may be a C1 to C20 alkyl group, for example C1 to C6 lower alkyl group, a C7 to C10 middle alkyl group, or a C11 to C20 higher alkyl group.

The term "aromatic group" may refer to a compound including a cyclic structure where all elements have p-orbitals which form conjugation. An aryl group and a heteroaryl group may be exemplified.

The term "aryl group" may refer to a monocyclic or fused ring-containing polycyclic (i.e., rings sharing adjacent pairs of carbon atoms) groups.

The term "heteroaryl group" may refer to one including 1 to 3 heteroatoms including N, O, S, and/or P in aryl group, in place of 1 to 3 carbon atoms. When the heteroaryl group is a fused ring, each ring may include 1 to 3 heteroatoms.

As used herein, when a specific definition is not otherwise provided, (meth)acrylate may refer to acrylate or methacrylate. The (meth)acrylic acid alkyl ester refers to acrylic acid alkyl ester or methacrylic acid alkyl ester, and (meth)acrylic acid ester refers to acrylic acid ester or methacrylic acid ester.

As used herein, when a definition is not otherwise provided, the "copolymerization" may refer to a block copolymerization, random copolymerization, graft copolymerization, or alternating copolymerization, and the term "copolymer" may refer to a block copolymer, random copolymer, graft copolymer, or alternating copolymer.

In one embodiment of the present invention, a thermoplastic resin composition including (A) a polycarbonate resin, (B) an aromatic vinyl-based copolymer, (C) a rubber modified vinyl-based graft copolymer, and (D) a glass fiber is provided.

The glass fiber (D) includes (D-1) a first glass fiber having a length of about 1 to about 200 μm and (D-2) a second glass fiber having a length of about 2 to about 6 mm.

The thermoplastic resin composition can have improved impact resistance, heat resistance, dimensional stability, and/or appearance characteristics.

The thermoplastic resin composition may include about 20 to about 70 wt % of the polycarbonate resin (A), about 15 to about 35 wt % of the aromatic vinyl-based copolymer (B), about 1 to about 20 wt % of a rubber modified vinyl-based graft copolymer (C), and about 5 to about 30 wt % of the glass fiber (D).

Hereinafter, each component of the thermoplastic resin composition is described in detail.

(A) Polycarbonate Resin

The polycarbonate resin may be prepared by reacting one or more diphenols represented by the following Chemical Formula 1 with a compound of a phosgene, halogenic acid ester, carbonate ester, or a combination thereof.

[Chemical Formula 1]

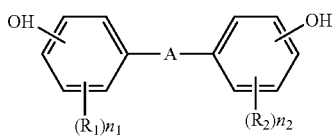

In the above Chemical Formula 1, A is a single bond, substituted or unsubstituted C1 to C30 linear or branched alkylene, substituted or unsubstituted C2 to C5 alkenylene, substituted or unsubstituted C2 to C5 alkynylene, substituted or unsubstituted C1 to C30 linear or branched haloalkylene, substituted or unsubstituted C5 to C6 cycloalkylene, substituted or unsubstituted C5 to C6 cycloalkenylene, substituted or unsubstituted C5 to C10 cycloalkynylene, substituted or unsubstituted C6 to C30 arylene, substituted or unsubstituted C1 to C20 linear or branched alkoxylene, a halogenic acid ester group, a carbonate ester group, CO, S or $SO_2$, each $R_1$ and $R_2$ is the same or different and is substituted or unsubstituted C1 to C30 alkyl or substituted or unsubstituted C6 to C30 aryl, and $n_1$ and $n_2$ are the same or different and are integers ranging from 0 to 4.

Two or more kinds of the diphenols represented by the above Chemical Formula 1 may be combined to constitute a repeating unit of a polycarbonate resin. Specific examples of the diphenols may include without limitation hydroquinone, resorcinol, 4,4'-dihydroxydiphenyl, 2,2-bis(4-hydroxyphenyl)propane (referred to be as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis (4-hydroxyphenyl)ketone, bis(4-hydroxyphenyl)ether, and the like, and combinations thereof. In exemplary embodiments, 2,2-bis(4-hydroxyphenyl)propane, 2,2-bis(3,5-dichloro-4-hydroxyphenyl)propane and/or 1,1-bis(4-hydroxyphenyl)cyclohexane may be used, for example, 2,2-bis (4-hydroxyphenyl)propane may be used.

The polycarbonate resin may be a copolymer or a mixture of copolymers obtained using two or more dipenols that differ from each other. Other examples of the polycarbonate resin may include without limitation linear polycarbonate resins, branched polycarbonate resins, polyestercarbonate copolymer resins, and the like, and combinations thereof.

The linear polycarbonate resin may include a bisphenol-A-based polycarbonate resin. The branched polycarbonate resin may be produced by reacting a multi-functional aromatic compound such as trimellitic anhydride, trimellitic acid, and the like with one or more diphenols and a carbonate. The multi-functional aromatic compound may be included in an amount of about 0.05 to about 2 mol% based on the total weight of the branched polycarbonate resin. The polyester carbonate copolymer resin may be produced by reacting difunctional carboxylic acid with one or more diphenols and a carbonate. The carbonate may include a diaryl carbonate such as diphenyl carbonate, ethylene carbonate, and the like, and combinations thereof.

The polycarbonate resin may have a weight average molecular weight of about 10,000 g/mol to about 25,000 g/mol, for example about 10,000 g/mol to about 24,000 g/mol, and as another example about 10,000 g/mol to about 23,000 g/mol.

When the polycarbonate resin has a weight average molecular weight within the above range, viscosity can decrease and fluidity can increase, and thus appearance may be effectively realized.

The thermoplastic resin composition may include the polycarbonate resin in an amount of about 20 wt % to about 70 wt %, for example about 35 wt % to about 65 wt %, based on the total weight (100 wt %) of the thermoplastic resin composition. In some embodiments, the thermoplastic resin composition may include the polycarbonate resin in an amount of about 20, 21, 22, 23, 24, 25, 26, 27, 28, 29, 30, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the polycarbonate resin can be in a range from about any of the foregoing amounts to about any other of the foregoing amounts.

When the polycarbonate resin is included in an amount within the above range, the composition may exhibit an improved balance of properties such as impact strength, heat resistance and/or processability.

(B) Aromatic Vinyl-Based Copolymer

The aromatic vinyl-based copolymer may be a copolymer of an aromatic vinyl-based monomer and an unsaturated nitrile monomer.

Examples of the aromatic vinyl-based monomer may include without limitation styrene; divinylbenzene; vinyltoluene; alkyl substituted styrene such as α-methylstyrene, p-t-butylstyrene, 2,4-dimethylstyrene, and the like; halogen substituted styrene; and the like; and combinations thereof. As used here, the alkyl may be C1 to C8 alkyl.

Examples of the unsaturated nitrile monomer may include without limitation acrylonitrile, methacrylonitrile, and the like, and combinations thereof.

The copolymer of the aromatic vinyl-based monomer and unsaturated nitrile monomer may be prepared by an emulsion polymerization method, a suspension polymerization method, a solution polymerization method, a mass polymerization method, and the like.

The aromatic vinyl-based copolymer may include the unsaturated nitrile monomer in an amount of about 10 wt % to about 40 wt % and the aromatic vinyl-based monomer in an amount of about 60 wt % to about 90 wt %, each based on the total weight (100 wt %) of the copolymer including the unsaturated nitrile monomer and the aromatic vinyl-based monomer.

In some embodiments, the aromatic vinyl-based copolymer may include the unsaturated nitrile monomer in an amount of about 10, 11, 12, 13, 14, 15, 16, 17, 18, 19, 20, 21, 22, 23, 24, 25, 26, 27, 28, 29, 30, 30, 31, 32, 33, 34, 35, 36, 37, 38, 39, or 40 wt %. Further, according to some embodiments of the present invention, the amount of the unsaturated nitrile monomer can be in a range from about any of the foregoing amounts to about any other of the foregoing amounts.

In some embodiments, the aromatic vinyl-based copolymer may include the aromatic vinyl-based monomer in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the aromatic vinyl-based monomer can be in a range from about any of the foregoing amounts to about any other of the foregoing amounts.

When the amounts of the unsaturated nitrile monomer and the aromatic vinyl-based monomer are within the above ranges, the thermoplastic resin composition including the same may exhibit excellent impact strength, fluidity, heat resistance, tensile strength, and the like.

A weight average molecular weight of the aromatic vinyl-based copolymer is not particularly limited, and may be about 40,000 g/mol to about 500,000 g/mol.

The thermoplastic resin composition may include the aromatic vinyl-based copolymer in an amount of about 15 wt % to about 35 wt %, based on the total weight (100 wt %) of the thermoplastic resin composition. In some embodiments, the thermoplastic resin composition may include the aromatic vinyl-based copolymer in an amount of about 15, 16, 17, 18, 19, 20, 21, 22, 23, 24, 25, 26, 27, 28, 29, 30, 30, 31, 32, 33, 34, or 35 wt %. Further, according to some embodiments of the present invention, the amount of the aromatic vinyl-based copolymer can be in a range from about any of the foregoing amounts to about any other of the foregoing amounts.

When the amount of the aromatic vinyl-based copolymer is within the above range, chemical resistance and heat resistance can be improved.

(C) Rubber-Modified Vinyl-based Graft Copolymer

The rubber modified vinyl-based graft copolymer is a copolymer including about 5 wt % to about 95 wt % of a vinyl-based polymer grafted on about 5 wt % to about 95 wt % of a rubbery polymer.

In some embodiments, the rubber modified vinyl-based graft copolymer may include the vinyl-based polymer in an amount of about 5, 6, 7, 8, 9, 10, 11, 12, 13, 14, 15, 16, 17, 18, 19, 20, 21, 22, 23, 24, 25, 26, 27, 28, 29, 30, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the vinyl-based polymer can be in a range from about any of the foregoing amounts to about any other of the foregoing amounts.

In some embodiments, the rubber modified vinyl-based graft copolymer may include the rubbery polymer in an amount of about 5, 6, 7, 8, 9, 10, 11, 12, 13, 14, 15, 16, 17, 18, 19, 20, 21, 22, 23, 24, 25, 26, 27, 28, 29, 30, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the rubbery polymer can be in a range from about any of the foregoing amounts to about any other of the foregoing amounts.

The vinyl-based polymer may be a polymer including about 50 wt % to about 95 wt % of a first vinyl-based monomer; and about 5 wt % to about 50 wt % of a second vinyl-based monomer.

In some embodiments, the vinyl-based polymer may include the first vinyl-based monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the amount of the first vinyl-based monomer can be in a range from about any of the foregoing amounts to about any other of the foregoing amounts.

In some embodiments, the vinyl-based polymer may include the second vinyl-based monomer in an amount of about 5, 6, 7, 8, 9, 10, 11, 12, 13, 14, 15, 16, 17, 18, 19, 20, 21, 22, 23, 24, 25, 26, 27, 28, 29, 30, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the second vinyl-based monomer can be in a range from about any of the foregoing amounts to about any other of the foregoing amounts.

Examples of the first vinyl-based monomer may include without limitation aromatic vinyl monomers, acrylic-based monomers, heterocyclic monomers, and the like, and combinations thereof.

Examples of the second vinyl-based monomer may include without limitation of unsaturated nitrile monomers, heterogeneous acrylic-based monomers different from the acrylic-based monomer of the first vinyl-based monomer, heterogeneous heterocyclic monomers different from the heterocyclic monomer of the first vinyl-based monomer, and the like, and combinations thereof.

As used herein, the term "heterogeneous" refers to different kinds from each other.

Examples of the aromatic vinyl monomer may include without limitation styrene, C1 to C10 alkyl substituted styrene, halogen substituted styrene, and the like, and combinations thereof. Examples of the alkyl substituted styrene may include without limitation o-ethylstyrene, m-ethylstyrene, p-ethylstyrene, α-methylstyrene, and the like, and combinations thereof.

Examples of the acrylic-based monomer may include without limitation (meth)acrylic acid alkyl esters, (meth)acrylic acid esters, and the like, and combinations thereof. As used herein with reference to the acrylic-based monomers, the alkyl may refer to C1 to C10 alkyl. Examples of the (meth) acrylic acid alkyl ester may include without limitation methyl (meth)acrylate, ethyl(meth)acrylate, propyl(meth)acrylate, butyl(meth)acrylate, and the like, and combinations thereof. In exemplary embodiments, methyl(meth)acrylate may be used.

Examples of the heterocyclic monomer may include without limitation maleic anhydride, C1-C10 alkyl and/or phenyl N-substituted maleimide, and the like, and combinations thereof.

Examples of the unsaturated nitrile monomer may include without limitation acrylonitrile, methacrylonitrile, ethacrylonitrile, and the like, and combinations thereof.

Examples of the rubbery polymer may include without limitation butadiene rubbers, acrylic rubbers, ethylene/propylene rubbers, styrene/butadiene rubbers, acrylonitrile/butadiene rubbers, isoprene rubbers, ethylene-propylene-diene terpolymer (EPDM) rubbers, polyorganosiloxane/polyalkyl (meth)acrylate rubber composites, and the like, and combinations thereof.

An average particle diameter of a rubbery polymer particle during the preparation of the rubber modified vinyl-based graft copolymer may be about 0.05 to about 4 μm so as to improve impact resistance and surface characteristics of molded articles, which can provide excellent impact strength.

The rubber modified vinyl-based graft copolymer may be used singularly or in a mixture of two or more kinds.

Specific examples of the rubber modified vinyl-based graft copolymer may include without limitation styrene, acrylonitrile and optionally methyl(meth)acrylate as a form of a mixture which are graft-copolymerized on a butadiene rubber, an acrylic rubber, or a styrene/butadiene rubber.

Another specific example of the rubber modified vinyl-based graft copolymer may include without limitation methyl (meth)acrylate which is graft-copolymerized on a butadiene rubber, an acrylic rubber, or a styrene/butadiene rubber.

Yet another specific example of the rubber modified graft copolymer may include without limitation an acrylonitrile-butadiene-styrene graft copolymer.

A method of preparing the rubber modified vinyl-based graft copolymer is well-known by a person having an ordinary skill in this art, may be any method of emulsion polymerization, suspension polymerization, solution polymerization or mass polymerization, and specific examples thereof may be a emulsion polymerization or mass polymerization by adding above vinyl-based monomers and using a polymerization initiator in the presence of a rubbery polymer.

The thermoplastic resin composition may include the rubber modified vinyl-based graft copolymer in an amount of about 1 wt % to about 20 wt %, for example about 3 wt % to about 15 wt %, based on the total weight (100 wt %) of the thermoplastic resin composition. In some embodiments, the thermoplastic resin composition may include the rubber modified vinyl-based graft copolymer in an amount of about 1, 2, 3, 4, 5, 6, 7, 8, 9, 10, 11, 12, 13, 14, 15, 16, 17, 18, 19, or 20 wt %. Further, according to some embodiments of the present invention, the amount of the rubber modified vinyl-based graft copolymer can be in a range from about any of the foregoing amounts to about any other of the foregoing amounts.

When the thermoplastic resin composition includes the rubber modified vinyl-based graft copolymer in an amount within the above range, the thermoplastic resin composition can have improved mechanical strength, impact strength and/or heat resistance.

(D) Glass Fiber

The glass fiber includes (D-1) a first glass fiber having a length of about 1 μm to about 200 μm and (D-2) a second glass fiber having a length of about 2 mm to about 6 mm. The glass fiber may improve impact strength, heat resistance, and/or dimensional stability and simultaneously may secure excellent appearance characteristics when added to the thermoplastic resin composition.

In the glass fiber, a "length" indicates the longest length of the glass fiber. In addition, a "thickness" in the glass fiber indicates the shortest diameter in the cross section of the glass fiber.

The second glass fiber (D-2) may include a generally-used glass fiber in the art related to the present invention. In some embodiments, the second glass fiber (D-2) may have a length ranging from about 2, 3, 4, 5, or 6 mm. Further, according to some embodiments of the present invention, the second glass fiber (D-2) may have a length ranging from about any of the foregoing lengths to about any other of the foregoing lengths.

For example, the second glass fiber (D-2) may have a length ranging from about 2 mm to about 5 mm, for example about 2 mm to about 4 mm, and as another example about 3 mm to about 5 mm.

The second glass fiber (D-2) may improve impact strength and dimensional stability of a thermoplastic resin composition and a molded article using the same.

The first glass fiber (D-1) may be prepared by grinding the second glass fiber (D-2). In other words, the first glass fiber (D-1) may be a milled glass fiber.

In some embodiments, the first glass fiber (D-1) may have a length ranging from about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, or 200 μm. Further, according to some embodiments of the present invention, the first glass fiber (D-1) may have a length ranging from about any of the foregoing lengths to about any other of the foregoing lengths.

For example, the first glass fiber (D-1) may have a length ranging from about 10 μm to about 200 μm, for example about 50 μm to about 200 μm, as another example about 1 μm to about 150 μm, as another example about 10 μm to about 150 μm, and as another example about 50 μm to about 150 μm.

The first glass fiber (D-1) may improve appearance characteristics of a thermoplastic resin composition and a molded article using the same.

The thermoplastic resin composition includes the first glass fiber (D-1), which can provide excellent appearance characteristics, and also includes the second glass fiber (D-2), which can improve impact strength and dimensional stability. In other words, the present invention uses a mixture of the two kinds of glass fibers which may improve impact strength and dimensional stability and simultaneously, secure excellent appearance characteristics.

The first glass fiber (D-1) and the second glass fiber (D-2) may be present in a weight ratio of about 1:1 to about 1:4, for example a weight ratio of about 1:1 to about 1:3. When the weight ratio of the first glass fiber (D-1) and the second glass fiber (D-2) is within the above range, impact strength and dimensional stability may not only sufficiently be improved, but deterioration of appearance characteristics may also be prevented.

The glass fiber may be treated with a glass fiber treatment agent in order to block a reaction of a polycarbonate resin and/or improve a degree of impregnation.

The glass fiber may be treated during the manufacturing process thereof or in a post-manufacture processing step. Examples of the glass fiber treatment agent may include without limitation lubricants, coupling agents, surfactants, and the like, and combinations thereof. The lubricant is used to form a strand having a uniform diameter and thickness during manufacture of a glass fiber, and the coupling agent plays a role of providing good adherence between the glass fiber and the resin. The above various treatment agents may be appropriately selected depending on kinds of the resin and glass fiber used and to provide good properties to a material reinforcing the glass fiber.

The thermoplastic resin composition may include the glass fiber (D) in an amount of about 5 wt % to about 30 wt %, for example about 5 wt % to about 25 wt %, as another example about 5 wt % to about 20 wt %, as another example about 10 wt % to about 30 wt %, as another example about 10 wt % to about 25 wt %, and as another example about 10 wt % to about 20 wt %, based on the total weight (100 wt %) of the thermoplastic resin composition. In some embodiments, the thermoplastic resin composition may include the glass fiber (D) in an amount of about 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the glass fiber (D) can be in a range from about any of the foregoing amounts to about any other of the foregoing amounts.

When the glass fiber is included in an amount within the above range, the thermoplastic resin composition and a molded article using the same may may have excellent impact strength, dimensional stability, and/or appearance characteristics.

(E) Other Additive(s)

The thermoplastic resin composition may further include one or more kinds of other additives in order to balance properties, or as needs of final uses. Examples of the other additives may include without limitation flame retardants, surfactants, nucleating agents, coupling agents, filler, plasticizers, impact-reinforcing agents, lubricants, antibacterial agents, release agents, antioxidants, inorganic material additives, colorants such as pigments and/or dyes, anti-static agents, flame proofing agents, heat stabilizers, ultraviolet (UV) absorbers, ultraviolet (UV) blocking agents, adhesives, and the like, and may be used singularly or in a combination of two or more.

The other additive may be included in a predetermined amount as long as it does not deteriorate the properties of the resin composition. For example, the other additive may be included in an amount of less than or equal to about 40 parts by weight, for example about 0.1 to about 30 parts by weight, based on about 100 parts by weight of the thermoplastic resin composition.

The above thermoplastic resin composition may be prepared by any well-known method in the art for preparing a resin composition. For example, each component according to one embodiment of the present invention can simultaneously mixed, optionally with one or more other additives. The mixture can be melt-extruded and prepared into a pellet.

In another embodiment of the present invention, a molded article manufactured using the thermoplastic resin composition is provided.

The molded article may be manufactured by various processes known in the art, such as injection-molding, blow molding, extrusion molding, compression molding, and the like, using the thermoplastic resin composition.

The first and second glass fibers may have a length changed during a melt-kneading process when the thermoplastic resin composition is manufactured into a molded article through extrusion molding, injection molding, and the like.

The molded article accordingly may include a third glass fiber (D-3) and a fourth glass fiber (D-4).

A part of the third glass fiber may be a first glass fiber having a changed length, and/or a part of the third glass fiber may be a second glass fiber having a changed length.

A part of the fourth glass fiber may be a second glass fiber having a changed length, and/or a part of the fourth glass fiber may be a first glass fiber having a changed length.

In the molded article, the third glass fiber may have a length ranging from about 0.1 µm to about 100 µm, for example, about 1 µm to about 100 µm, as another example about 10 µm to about 100 µm, as another example about 20 µm to about 100 µm, as another example about 30 µm to about 100 µm, and as another example about 40 µm to about 100 µm. In some embodiments, the third glass fiber may have a length ranging from about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 µm. Further, according to some embodiments of the present invention, the third glass fiber may have a length ranging from about any of the foregoing lengths to about any other of the foregoing lengths.

The molded article includes the third glass fiber and may have improved impact strength, heat resistance, and dimensional stability and simultaneously, may exhibit excellent appearance characteristics.

In the molded article, the fourth glass fiber (D-4) may have a length ranging from about 150 µm to about 1,000 µm, for example, about 200 µm to about 1,000 µm.

The molded article includes the fourth glass fiber (D-4) and may show improved impact strength and dimensional stability.

In the molded article, the third glass fiber (D-3) and the fourth glass fiber (D-4) may be present in a weight ratio of about 1:1 to about 1:4, for example, about 1:1 to about 1:3. When the third glass fiber (D-3) and the fourth glass fiber (D-4) are present in an amount within the above weight ratio, the molded article may have excellent impact strength and dimensional stability and simultaneously, may be prevented from deterioration of appearance characteristics.

The molded article may secure improved weather resistance as well as excellent mechanical properties such as impact and heat resistances and may be advantageously applied to various outdoor electronic parts, building materials, sport goods, auto parts, and the like. Specifically, the molded article has excellent heat resistance, dimensional stability, and appearance and may be used for a roof material for an auto.

Hereinafter, the present invention is illustrated in more detail with reference to the following examples and comparative examples. However, the following examples and comparative examples are provided for the purpose of illustration only and the present invention is not limited thereto.

Examples 1 to 3 and Comparative Examples 1 to 6

Each pellet-shaped resin is prepared by mixing the components provided in the following Table 1 in an amount shown in the following Table 1 and then, extruding and processing the resultant mixtures. The mixtures are extruded using a twin-screw extruder having L/D=29 and a diameter of 45 mm and setting a barrel temperature at 230° C.

TABLE 1

(unit: wt %)

|  |  | Example | | | Comparative Example | | | | | |
|---|---|---|---|---|---|---|---|---|---|---|
|  |  | 1 | 2 | 3 | 1 | 2 | 3 | 4 | 5 | 6 |
| (A) polycarbonate | A-1 |  | 10 | 15 |  | 7 |  |  |  |  |
| resin | A-2 | 13 |  |  | 17 | 40 |  | 17 |  | 13 |
|  | A-3 | 39 | 41 | 33 | 30 |  |  | 35 |  | 39 |
| (A') polyester resin |  |  |  |  |  |  | 85 |  |  |  |
| (B) aromatic vinyl-based copolymer |  | 23 | 25 | 29 | 25 | 23 | 25 |  | 33 | 70 |
| (C) rubber modified vinyl-based graft copolymer |  | 10 | 9 | 8 | 13 | 10 | 8 |  |  | 15 |
| (D) glass fiber | D-1 | 5 | 3 | 7 | 15 |  |  | 5 | 5 | 5 |
|  | D-2 | 10 | 12 | 8 |  |  | 15 | 10 | 10 | 10 |
| (E) talc |  |  |  |  |  | 20 |  |  |  |  |

Each component in Table 1 is described as follows.

(A-1) The polycarbonate resin is SC-1080 made by Cheil Industries Inc. and having a weight average molecular weight of 27,000g/mol.

(A-2) The polycarbonate resin is SC-1190 made by Cheil Industries Inc. and having a weight average molecular weight of 22,000g/mol.

(A-3) The polycarbonate resin is SC-1620 made by Cheil Industries Inc. and having a weight average molecular weight of 16,000g/mol.

(A') The polyester resin is polybutylene terephthalate, DHK011 having an inherent viscosity of 1.2 dL/g and made by Shinkong Corp.

(B) The aromatic vinyl-based copolymer is a styrene-acrylonitrile (SAN) copolymer resin including acrylonitrile in an amount of 28.5 wt % and a weight average molecular weight of 90,000 g/mol.

(C) The rubber modified vinyl-based graft copolymer is a g-ABS resin having a core-shell structure prepared by emulsion-graft polymerizing a rubbery polymer having an average rubber particle diameter of 0.27 μm.

(D-1) The glass fiber is EFH75-01 having a length ranging from 10 to 100 μm and made by Central Glass Co. Ltd.

(D-2) The glass fiber is CS321-EC10-3 having an average length of 3 mm and made by KCC Corp.

(E) The talc is UPN HS-T 0.5 made by Hayasi Kasei Co., Ltd.

Experimental Examples

The pellets manufactured according to Table 1 are dried at 100° C. for 2 hours and manufactured into ⅛"-thick specimens for measuring Izod impact strength according to ASTM D256 by using a 6 oz. injection molding machine setting at a cylinder temperature of 240° C. and a molding temperature of 60° C., ¼"-thick specimens for measuring a heat deflection temperature according to ASTM D648, and a specimen having a size of 9 cm×5 cm×0.2 cm. The specimens are measured for various properties using the following methods, and the results are provided in the following Table 2.

(1) Impact Strength Measurement: Izod impact strength (Izod) is measured according to ASTM D256. (specimen thickness: ⅛")

(2) Heat Resistance Measurement: Heat deflection temperature (HDT) is measured according to ASTM D648. (load: 18.5 kgf/cm$^2$)

(3) Dimensional Stability Measurement: A coefficient of thermal expansion (CTE) in a flow direction and a coefficient of thermal expansion in a xflow direction (vertical direction of the flow direction) according to ASTM E831 are measured. (−20° C.-100° C.)

(4) Measurement of Glass Fiber Length and Content Ratio in Molded Article:

0.5 to 1.0 g of glass fiber left after removing a resin and the like as an organic material by putting 5 g of the pellets in a pot and heating it at about 800° C. for 30 minutes to 60 minutes in a furnace.

A weight of the glass fiber is measured, each length of the third glass fiber having a length ranging from 0.1 to 100 μm and of the fourth glass fiber having a length ranging from 150 to 1,000 μm is measured by digital microscope (AnMo Electronics Corp., Dino-Lite digital microscope), and a length ratio between the third glass fiber and the fourth glass fiber is calculated.

Based on the length ratio between the third glass fiber and the fourth glass fiber and the weights of the third and fourth glass fibers, a weight ratio of the third and fourth glass fibers is calculated.

TABLE 2

|  |  |  | Example | | | Comparative Example | | | | | |
|---|---|---|---|---|---|---|---|---|---|---|---|
|  |  |  | 1 | 2 | 3 | 1 | 2 | 3 | 4 | 5 | 6 |
| Izod (⅛") | kgf · cm/cm |  | 7 | 7 | 7 | 5 | 5 | 8 | 7 | 3 | 9 |
| HDT (18.5 kgf/cm$^2$) | ° C. |  | 120 | 123 | 121 | 117 | 115 | 127 | 183 | 125 | 109 |
| CTE (−20-100° C.) | 1/° C. | flow | 37 | 36 | 35 | 47 | 47 | 30 | 32 | 33 | 43 |
|  |  | xflow | 76 | 77 | 75 | 80 | 78 | 81 | 110 | 71 | 80 |
| Average length of third glass fiber in molded article (μm) |  |  | 65 | 96 | 73 | 87 | — | — | 70 | 99 | 80 |
| Average length of fourth glass fiber in molded article (μm) |  |  | 891 | 377 | 269 | — | — | 856 | 723 | 890 | 652 |

TABLE 2-continued

|  | Example | | | Comparative Example | | | | | |
| --- | --- | --- | --- | --- | --- | --- | --- | --- | --- |
|  | 1 | 2 | 3 | 1 | 2 | 3 | 4 | 5 | 6 |
| Weight ratio of third glass fiber and fourth glass fiber in molded article | 1:2 | 1:2.6 | 1:1.2 | 1:0 | — | 0:1 | 1:1.8 | 1:1.9 | 1:1.9 |

Referring to Table 2, Comparative Example 1 using only the first glass fiber (D-1) and Comparative Example 2 using talc (E) exhibit very low impact strength, heat resistance, and dimensional stability.

Comparative Example 3 using only the second glass fiber (D-2) exhibit excellent impact strength and heat resistance but low dimensional stability in an xflow direction.

Comparative Example 4 using polyester (A') as a resin exhibit excellent impact strength and heat resistance but remarkably insufficient dimensional stability in an xflow direction.

Comparative Example 5 using no rubber-modified vinyl-based graft copolymer (C) exhibit excellent heat resistance and dimensional stability but remarkably low impact strength.

Comparative Example 6 using no polycarbonate resin (A) exhibit remarkably deteriorated heat resistance.

In contrast, Examples 1 to 3 have an Izod impact strength of 7 kgf·cm/cm and thus, excellent impact strength, heat deflection temperature (HDT) ranging from 120 to 123° C. and thus, high heat resistance and in addition, 35 to 37 of a coefficient of thermal expansion (CTE) in a flow direction and 75 to 77 of a coefficient of thermal expansion (CTE) in an xflow direction and thus, very high dimensional stability.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition comprising
   (A) a polycarbonate resin,
   (B) an aromatic vinyl-based copolymer,
   (C) a rubber modified vinyl-based graft copolymer, and
   (D) a glass fiber,
   wherein the glass fiber (D) comprises:
   (D-1) a first glass fiber having a length of about 1 μm to about 200 μm, and
   (D-2) a second glass fiber having a length of about 2 mm to about 6 mm.

2. The thermoplastic resin composition of claim 1, wherein the polycarbonate resin (A) has a weight average molecular weight of about 10,000 g/mol to about 25,000 g/mol.

3. The thermoplastic resin composition of claim 1, wherein the glass fiber (D) comprises the first glass fiber (D-1) and the second glass fiber (D-2) in a weight ratio of about 1:1 to about 1:4.

4. The thermoplastic resin composition of claim 1, comprising the glass fiber (D) in an amount of about 5 wt % to about 30 wt % based on 100 wt % of the thermoplastic resin composition.

5. The thermoplastic resin composition of claim 1, wherein the thermoplastic resin composition comprises:
   about 20 wt % to about 70 wt % of the polycarbonate resin (A),
   about 15 wt % to about 35 wt % of the aromatic vinyl-based copolymer (B),
   about 1 wt % to about 20 wt % of a rubber modified vinyl-based graft copolymer (C), and
   about 5 wt % to about 30 wt % of the glass fiber (D).

6. A molded article using the thermoplastic resin composition of claim 1.

7. The molded article of claim 6, wherein the molded article comprises (D-3) a third glass fiber having a length of about 0.1 μm to about 100 μm, and (D-4) a fourth glass fiber having a length of about 150 μm to about 1,000 μm.

8. The molded article of claim 7, wherein a weight ratio of the third glass fiber (D-3) and the fourth glass fiber (D-4) in the molded article is about 1:1 to about 1:4.

* * * * *